Figure 5:
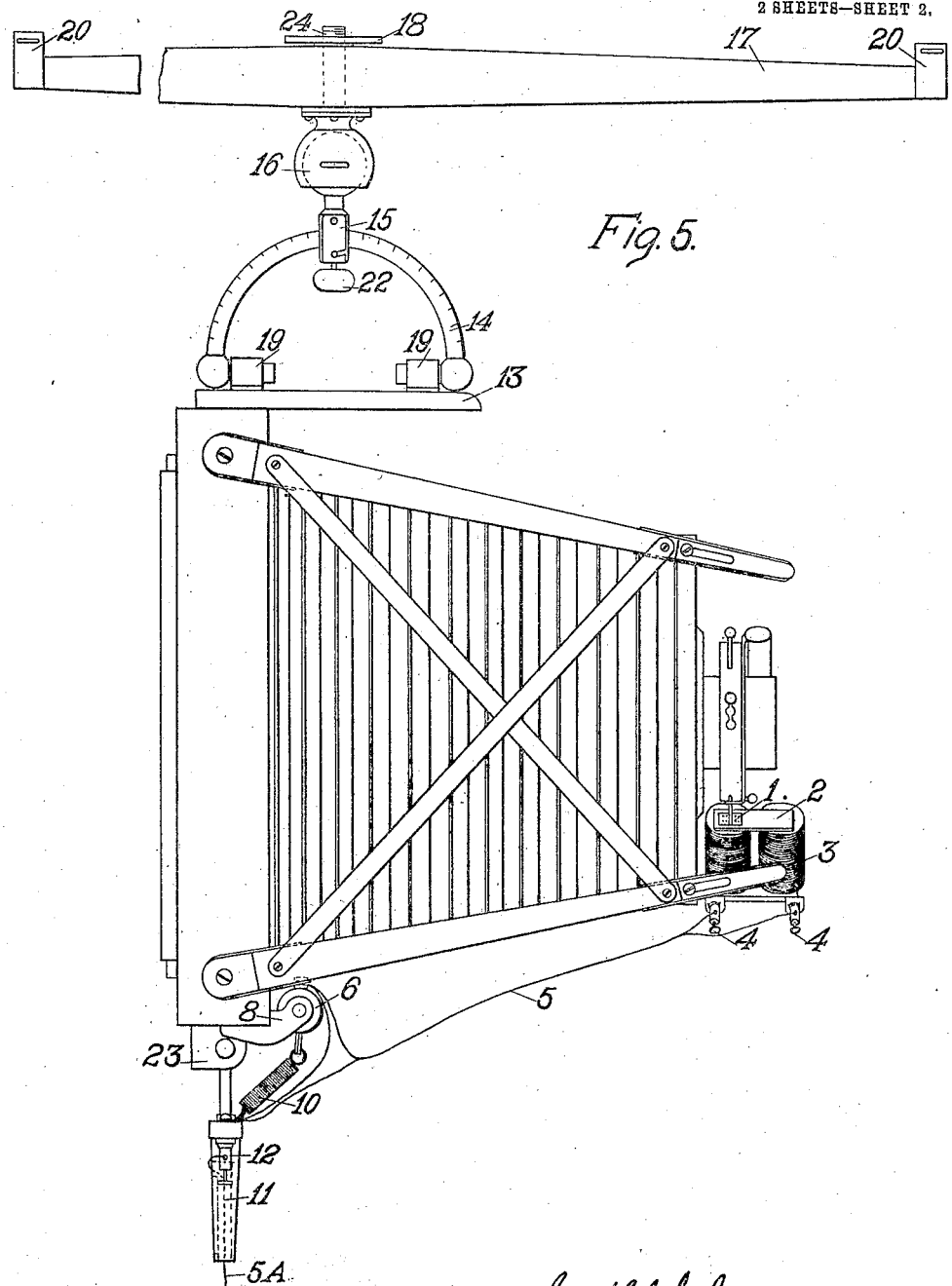

J. J. JOHNSON.
ART OF PHOTOGRAPHY.
APPLICATION FILED JAN. 29, 1906.
935,760.
Patented Oct. 5, 1909.
2 SHEETS—SHEET 1.
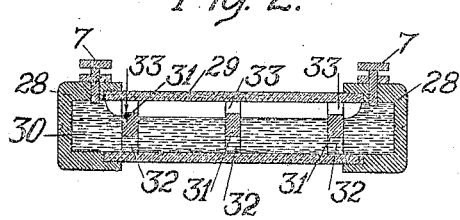
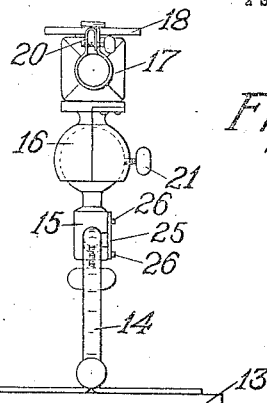
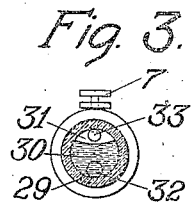
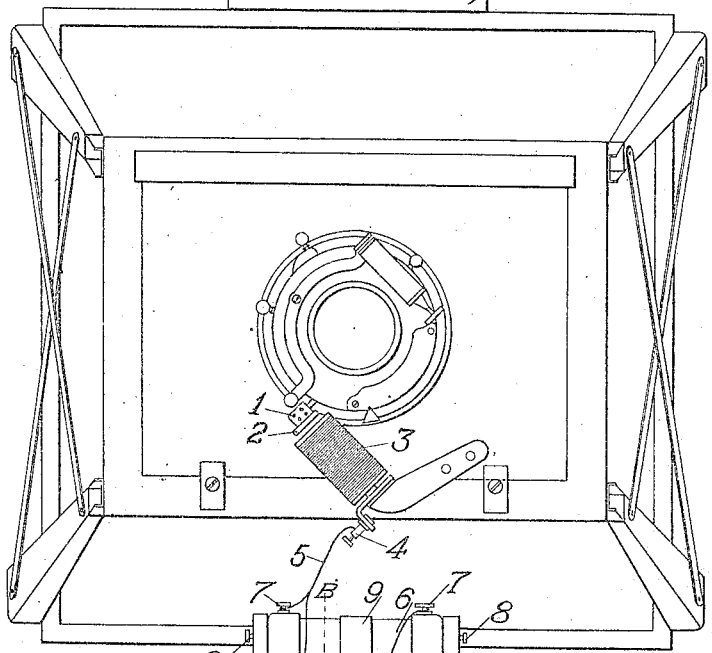
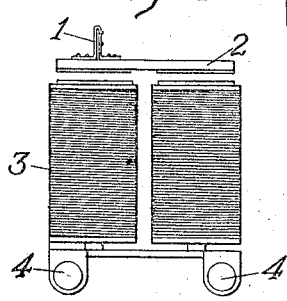
WITNESSES:
D. W. Stewart
Joseph J. Johnson INVENTOR.

J. J. JOHNSON.
ART OF PHOTOGRAPHY.
APPLICATION FILED JAN. 29, 1906.

935,760.

Patented Oct. 5, 1909.
2 SHEETS—SHEET 2.

WITNESSES:
D. W. Stewart
Albert Kern

Joseph J. Johnson INVENTOR.

UNITED STATES PATENT OFFICE.

JOSEPH J. JOHNSON, OF DAYTON, OHIO.

ART OF PHOTOGRAPHY.

935,760.     Specification of Letters Patent.     Patented Oct. 5, 1909.

Application filed January 29, 1906. Serial No. 298,560.

*To all whom it may concern:*

Be it known that I, JOSEPH J. JOHNSON, citizen of the United States, residing at No. 28 East L street, Dayton, county of Montgomery, State of Ohio, have invented a new and useful Improvement in the Art of Photography.

The invention relates to a photographing device suspended from a kite line, the object of the invention being to make an exposure of a photographic plate or film at any desired height from the ground.

To this end my invention consists in a device for operating the shutter of a photographing device suspended from a kite line, by the use of electro-magnets attached to the lens board. And also in an improved means of determining the exact position of the camera at the time of exposure. And further in an improved means of suspending the camera from the kite line substantially as hereinafter described.

Reference is to be had to the accompanying drawings, forming a part of this specification, in which similar figures and letters of reference indicate corresponding parts in all views.

Figure 1 is a front view of my improved photographing device. Fig. 2 is a longitudinal sectional detail view of the leveling device. Fig. 3, is a cross sectional view on the line B. B. of Fig. 1. Fig. 4 is a side view of the electro-magnets showing the metal bar attached to the shutter trip. Fig. 5 is a side view of the entire device.

Number 1 in the drawing represents the shutter trip to which is attached the metal bar which extends across the face of the electro magnet 3, as shown in Fig. 4. When electrical connection is made the metal bar 2 is attracted toward the magnet 3 causing the shutter to operate.

Number 6 represents a leveling device which necessitates the camera being in an exactly level position before electrical connection will be made. This device is shown in Figs. 2 and 3.

Number 29 is a glass tube inclosed at both ends by the wood-fiber caps 28 through which extend the binding posts 7 between which the liquid 30, preferably quicksilver, makes connection when the camera becomes level.

Number 31 are partitions in the tube 29 with openings 33 at the top to prevent a vacuum in any particular chamber, and 32 are openings in the bottom of the partitions through which the liquid 30 flows. This arrangement affords a steady flow of the liquid. The level 6 is pivoted between the brackets 8 which are attached to the bottom of the camera. The spring 10 is a flexible connection attached to the wire support 11 at one end and to the extended end of a clip 9 on the level 6 at the other end.

It will be seen that if the front of the camera was changed from the horizontal position as shown in Fig. 5 by sliding the hanger 14 through the clamp 15 in the lower end of the lower part of the ball and socket joint and fastening it with the set screw 22, the wire support 11 which is hinged in brackets 23 would still retain its vertical position by the weight of the two electric wires 5ᴬ, which extend downward to the electric batteries at the ground and at the same time the level 6 which is pivoted in brackets 8 would be carried with the movement of the wire support and thus the binding posts 7 would always be at the highest part of the level and directly over the air chamber in the level.

The wires 5ᴬ are of the twin type and extend upward from the electric batteries at the ground and through the wire support 11 where they are divided and attached to the binding posts 12. Electrical connections are made in series through the binding posts 12—27—7 and 4 as shown by wire 5 in Fig. 1. Contact is made from the electric batteries at the ground by the operator, through any suitable switch. The entire device is suspended from a kite line by the supporting bar 17 at the ends of which are clamps 20 which in practice are clamped on the holding line of the kite to prevent the entire apparatus from sliding down said line while in use.

24 is the upper part of the ball and socket joint 16 and extends through the supporting bar 17 where it is threaded and secured to said bar by nut 18. The object to be attained by the ball and socket joint is to make it possible to turn the camera to any desired direction and by tightening the set screw 21 to hold the ball and socket rigid while in operation. In the lower end of the lower part of the ball and socket joint 16 there is a clamp 15 through which slides graduated hanger 14. The hanger 14 is hinged in brackets 19, said brackets are fastened to arm 13 which in turn is fastened to the upper part of the camera as shown in Fig. 5. By this arrangement of parts the camera will hang in practically a level position. It will be readily seen that if the camera was tilted up or down at either side the liquid 30 in the level would flow to the lower end of the level and the air in the level to the higher end, thus making it impossible to get electrical connection until the camera had assumed a level position and both of the binding posts were in contact with the liquid in the level which forms part of the electric circuit. By this means the electric circuit is automatically broken when the camera is out of level and closed when the camera assumes a level position.

In making photographic exposures with this apparatus, I proceed as follows: taking a single kite for example. The kite being made fast to the free end of the kite line at the winding drum, the kite is now started upward and allowed to carry with it approximately one thousand feet of line. The supporting bar 17 is now made fast to the line by closing the clamps 20. The hanger 14 is placed in the recess 15 and is held rigid in the position desired by tightening the set screw 22. The ball is now turned in the socket until the object to be photographed is in front of the lens and secured by set screw 21. The free ends of the twin wires 5ᴬ are now passed upward through the wire support 11, connections being made to binding posts 12. The kite is now started upward again by an assistant who allows the kite line to unwind and at the same time the operator carries the reel on which is wound the wires for carrying the electric current and electric batteries keeping them directly under the camera as it rises, and at the same time allowing the wires to unwind until the desired height is attained. The operator now watches the camera until it becomes still when the electric button is pushed and the exposure is made. Having anchored the winding drum the assistant now places a grooved wheel with a suitable handle on the kite line at winding drum and by walking along under the line, the camera will be brought to the ground, the plate holder changed and a return of the assistant to the winding drum with the grooved wheel over the kite line as before will again cause the camera to be carried to the former position. By this mode of operation it is possible to make photographic exposures at a height of from four hundred to eight hundred feet in about five to twelve minutes.

Having thus described my invention, what I claim as new and desire to secure by Letters Patent of the United States is.

1. In the combination, with a kite line, a supporting bar secured to said line, parts forming a ball and socket joint and secured to said bar, a graduated hanger connected with said ball and socket joint and hinged in brackets which are secured to an arm, said arm being fastened to the top of camera substantially as specified.

2. In a photographic apparatus secured to a kite line, a leveling device in the level of which is a suitable liquid for carrying the electric current and forming part of the electric circuit for operating the camera shutter substantially as specified.

3. In a photographic apparatus secured to a kite line a hinged wire support, a leveling device connected in the electric current between said hinged wire support and the electromagnets, both the support and the level having suitable binding posts for securing the terminal of wires for carrying the electric current from batteries at the ground for operating the camera shutter, substantially as specified.

JOSEPH J. JOHNSON.

Witnesses:
MAURICE J. LEEN,
R. N. BRUMBAUGH.